United States Patent [19]

Dransch, deceased et al.

[11] 3,915,983

[45] Oct. 28, 1975

[54] SUBSTITUTED BENZIMIDAZOLES

[75] Inventors: Günter Karl Wilhelm Otto Dransch, deceased, late of Eschborn, Germany; by Annelise Klara Helene Wiesenhutter, heiress, Eschborn, Germany; by Johanna Mathilde Flersheim, heiress, Berlin, Germany; Heinz Boesenberg, Hofheim, Germany; Hilmar Mildenberger, Kelkheim, Germany; Kurt Härtel; Reinhard Kirsch, both of Hofheim, Germany

[73] Assignee: Hoechst Aktiengesellschaft, Frankfurt am Main, Germany

[22] Filed: Jan. 24, 1974

[21] Appl. No.: 436,356

[30] Foreign Application Priority Data

Jan. 27, 1973  Germany............................ 2303999

[52] U.S. Cl.. 260/309.2; 260/453 AP; 260/453 PH; 260/464; 260/544 C; 260/563 P; 424/273
[51] Int. Cl.² ........................................ C07D 235/32
[58] Field of Search ................................ 260/309.2

[56] References Cited

UNITED STATES PATENTS

| | | | |
|---|---|---|---|
| 3,660,421 | 5/1972 | Osieka et al. | 260/309.2 |
| 3,705,173 | 12/1972 | Adams et al. | 260/309.2 |
| 3,738,995 | 6/1973 | Adams et al. | 260/309.2 |

Primary Examiner—Sherman D. Winters
Attorney, Agent, or Firm—Curtis, Morris & Safford

[57]  ABSTRACT

Benzimidazoles of the formula

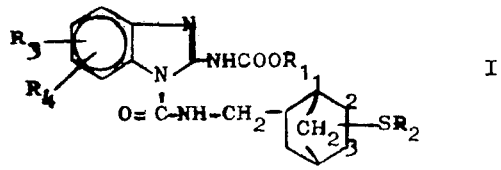

wherein $R_1$ is alkyl, $R_2$ is alkyl, cyclo-alkyl, benzyl or phenyl, $SR_2$ being in 2- or 3-position, $R_3$ is hydrogen, alkyl, aliphatic saturated alkanoyl, chlorine, bromine, cyano, methoxy, ethoxy, phenoxy, phenylthio or benzoyl, and $R_4$ is hydrogen, chlorine or methyl are valuable fungicides and anthelminthics.

8 Claims, No Drawings

SUBSTITUTED BENZIMIDAZOLES

Subject of the present invention are benzimidazoles having the formula

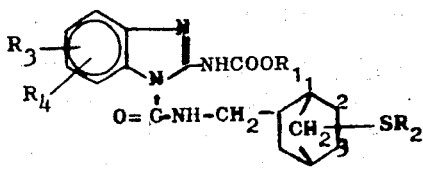

wherein $R_1$ represents alkyl having from 1 to 4 carbon atoms,
$R_2$ represents alkyl having from 1 to 5 carbon atoms, cycloalkyl having from 5 to 8 carbon atoms, benzyl or phenyl, each being in 2- or 3-position
$R_3$ represents hydrogen, alkyl having from 1 to 4 carbon atoms or alkanoyl having from 1 to 4 carbon atoms, chlorine, bromine, cyano, methoxy, ethoxy, phenyloxy, phenylthio or benzoyl, and
$R_4$ represents hydrogen, chlorine or methyl, as well as mixtures of the isomers obtained by interchanging $R_3$ and $R_4$.

Another subject of the invention is a process for preparing the compound of the formula I which comprises reacting a. a benzimidazole having the formula

with an isocyanate having the formula

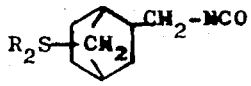

or with a carbamic acid halide having the formula

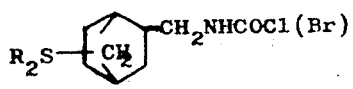

or b. a derivative of a chloro (or bromo) carbonylbenzimidazole having the formula

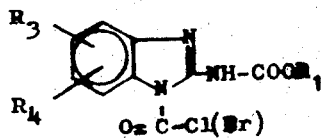

with an amine having the formula

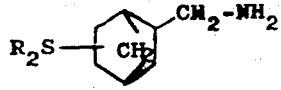

Preference is given to methyl, ethyl, n-propyl and n-butyl for $R_2$, to hydrogen, n-butyl and phenylmercapto in 5- or 6- position for $R_3$ and to hydrogen for $R_4$.

The compounds according to the invention are characterized by excellent and anthelminthic effects.

The most advantageous method of preparing the compound according to the invention according to process (a) consists in suspending a benzimidazole derivative of the formula II in an inert solvent such as dimethyl formamide, methyl ethyl ketone, methylene chloride, chloroform, chlorobenzene, tetrahydrofurane, or acetonitrile and mixing it, while stirring, with an approximately stoichiometric quantity of an isocyanate having the general formula III, preferably operating at temperatures ranging from +5° to +55°C. Generally, the reaction periods last from about 1 to abt. 8 hours.

If the reaction starts with carbamic acid halide having the formula IV, same is first prepared by adding at about 0° to 25°C an amine having the formula VI to a solution of phosgene in an inert organic solvent such as benzene or tetrahydrofurane, by subsequently filtering off the hydrochloride of the amine and by eliminating excess phosgene by distillation in vacuo. Next is added an approximately stoichiometric quantity of the benzimidazole derivative having the formula II, followed by the addition of an acid binding agent, for example a tertiary amine or potassium carbonate. This reaction step is generally carried out at a temperature from 0° to 35°C, the subsequent work-up being performed as usual.

In process (b), in the first phase, for example, a derivative of 2-benzimidazole having the formula II is treated at about from −20° to +20°C with a solution of phosgene in an inert organic solvent, subsequently an equivalent quantity of a tertiary amine such as dimethylaniline, triethylamine or pyridine is added and finally the hydrochloride is separated. After having eliminated the excess phosgene by distillation, the product is reacted with twice the stoichiometric quantity of an amine having the formula VI within a temperature range from about 0° to 40°C and worked up as usual.

As per formula II or V the following compositions may, for example, be used as starting products for the preparation of the compounds according to the invention.

2-methoxy-, 2-ethoxy-, 2-n-propoxy-, 2-isopropoxy-, 2-butoxy-, 2-isobutoxy-carbonylamino-benzimidazole, 5(6)-methyl-, 5-(6)-ethyl-, 5(6)-butyl-, 5(6)-sec.butyl-, 5(6)-tert.butyl-, 5(6)-yano-, 5(6)-chloro, 5(6)-bromo-, 5(6)-methoxy-, 5(6)-phenylmercapto-, 5(6)-phenyloxy-, 5(6)-acetyl, 5-phenylmercapto-7-chloro-, 5,6-dichloro-, 5,6-di-methyl-, 5-chloro-6-butyl-, 4,6-dichloro-2-methoxy-(ethoxy-, propoxy-, butoxy-)-carbonylaminobenzimidazole.

These initial compounds are reacted with compounds having the formula III, IV or VI, wherein $R_2$ represents methyl, ethyl, propyl, isopropyl, butyl, isobutyl, tert.butyl, pentyl, 3-methylbutyl, 2-methylbutyl, cyclopentyl, cyclohexyl, cycloheptyl, cyclooctyl, benzyl, or phenyl.

In part the initial compounds having the formula II are known, partially they are accessible through known preparation processes (cf. U.S. Pat. No. 2,933,502).

Since both nitrogen atoms are equally available for reactions at the imidazole ring, it is often difficult to determine positively whether, if the compound contains two substituents $R_3$ and $R_4$, The substituent $R_3$ is in 5-position or, rather, the substituent $R_4$. The same is true for a substituent in 4-position which may as well be in 7-position. In some cases isomeric mixtures may be obtained during the reaction so that the final products are not uniform. However, this has no adverse effect on either the fungicidal or the anthelminthic effect.

The compounds of formula III are obtained by addition of a mercaptan having the formula $R_2SH$ to a 2-isocyanatomethylbicyclo [2,2,1]-heptene. It is, however, more advantageous to prepare first a compound having the formula VI:

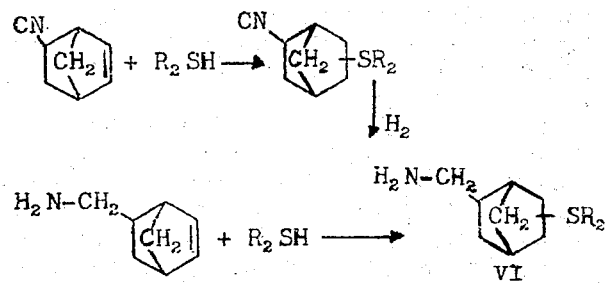

They are obtained by reacting 2-aminomethyl-heptene or 2-cyanobicyclo [2,2,1]-5-heptene with a mercaptan having the formula $R_2SH$, the cyano group —in case a nitrile is used — being subsequently reduced by means of a catalyst or of $LiAlH_4$.

The amines of the formula VI thus obtained may be transformed in the usual manner by phosgenation into the corresponding isocyanates or carbamic acid chlorides.

The compounds according to the invention have outstanding fungicidal properties and an especially broad spectrum of effectiveness. Having a very low toxicity for warm-blooded animals and protective as well as curative systemic properties, they can be used particularly for protecting crop plants in agriculture.

Due to their systemic properties, they can further be used for the treatment of seed or soil so as to subdue fungal diseases developing on the seedling. On the other hand, the compounds according to the invention are also efficient on dead organic material and may therefore be used to protect, for example, pigments, oils, wood, leather, protein, paper and textiles from fungus attack.

Without claiming to are complete, the following fungi be cited as being effectively combated by the compounds of the invention:

Botrytis cinerea
Oidium tuckeri
Cercospora beticola
Cercospora musae
Uromyces phaseoli
Septoria apii
Podospaera leucotricha
Venturia inaequalis
Erysiphe cichoracearum
Piricularia oryzae
Pellicularia sasakii
Fusarium nivale
Rhizoctonia solani
Verticillum alboatrum
Fusarium solani The fungicidal agents of the invention contain from 5 to 90 % of a benzimidazole having the formula (I) as active compound in the usual formulations in combination with solid or liquid additives such as inert carriers, adhesives, wetting and dispersing agents and grinding auxiliaries. They may be used as wettable powders, emulsions, suspensions, dusting powders or granules. They can also be mixed with other fungicides with which they form mixtures of good compatibility.

As carrier material, mineral substances may be used, such as aluminium silicates, argillaceous earths, kaolin, chalks, siliceous chalks, talcum, kieselguhr or hydrated silicic acids, or preparations of these mineral substances with special additives, for example chalk with sodium stearate. As carrier material for liquid preparations, all usual and suitable organic solvents may be employed, for example toluene, xylene, diacetone alcohol, cyclohexamone, isophorene, gasolines, paraffin oils, dioxane, dimethyl formamide, dimethyl sulfoxide, ethyl acetate, tetrahydrofuran, chlorobenzene and the like.

As adhesives, there may be used glue-like cellulose products or polyvinyl alcohols.

As wetting agents, all suitable emulsifiers may be used, such as oxethylated alkylphenols, salts of aryl- or alkylaryl-sulfonic acids, salts of oleyl methyl taurine, salts of oxethylated phenyl sulfonic acids, or soaps.

Suitable dispersing agents are cellulose pitch (salts of lignin sulfonic acid), salts of naphthalenesulfonic acid or salts of oleyl methyl taurine.

As grinding auxiliaries, suitable inorganic or organic salts, such as sodium sulfate, ammonium sulfate, sodium carbonate, sodium bicarbonate, sodium thiosulfate, sodium stearate or sodium acetate may be used.

The products of the invention are also suitable for combating parasitic diseases of warm-blooded animals, especially helminths.

They are characterized by a particularly strong anthelminthic effect, combined with a good compatibility, against gastrointestinal strongyles to which ruminants are especially prone. These parasites can cause enormous economical damage to animal breeding. Therefore, the products of the process represent valuable medicaments. In practice, the anthelminthics are administered orally or subcutaneously, the preferred application form depending on the special circumstances. For oral administration suspensions having concentration from 1–50 %, powders dispersable in water (concentration from 1–80 %, preferably from 40–70 %), pastes as well as granules of various concentrations; for parenteral treatment sterile solutions of variable concentration are used. Various additives are required so as to guarantee good distribution, stabilization and preservation of the active agent as well as a better resorption. Talcum, lactose, magnesium stearate, aerosil, starch or polyethylene-glycol are preferred.

The following examples illustrate the invention:

EXAMPLES OF PREPARATION:

EXAMPLE 1

2-aminomethyl-5-(6)-ethylmercapto-bicyclo[2,2,1]heptane a. The mixture of 92.5 grams of 2-aminomethyl-bicyclo[2,2,1]2-heptene and 51.5 grams of ethylmercaptan is stirred in 150 ml of chlorobenzene at 45°C for 19 hours while adding 0.5 gram of azodiisobutyric-acid-nitrile; after another addition of 0.5 gram of azodiisobutyric-acid-nitrile stirring is continued for another 4 hours at 60°C and a final 4 hours at 100°C. Subsequently, the chlorobenzene is eliminated by distillation in a water jet vacuum, and 2-aminomethyl-5(6)-ethylmercapto-bicyclo[2,2,1]heptane is obtained by fractional distillation.

Yield: 127 g, (92.5 % of theory) $bp_{0.2}$ 83°–85°C.

b. To the suspension of 24.6 grams of $LiAlH_4$ in 500 ml of ether are added, while stirring, within 45 minutes, after nitrogen replacing the air in the flask 91 g of 2-cyano-5(6)-ethylmercapto-bicyclo[2,2,1]-heptane. Subsequently, the suspension is kept at reflux temperatures for 2 hours. Finally, 140 ml of water and 40 ml of 15 % NaOH are added dropwise under ice cooling. Solid matter is filtered off the ethereal solution, the latter is dried over KOH, and first the ether and then the residual oil are distilled off 76 g (82 % of theoretical yield) of 2-aminomethyl-5(6)-ethylmercapto-bicyclo[2,2,1]heptane $bp_{0.3} = 95°C$ are obtained.

EXAMPLE 2

2-isocyanatomethyl-5(6)-ethylmercapto-bicyclo[2,2,1]-heptane a. 130 g of phosgene are introduced at 0°C into 800 ml of chlorobenzene, 200 g of aminomethyl-5(6)-ethylmercapto-bicyclo[2,2,1]-5-heptane added dropwise while stirring and continuing the introduction of phosgene, and the temperature is increased slowly to 120°C over a period of 8 hours. After the deposit has almost completely dissolved excess phosgene is blown out at 60°C through a nitrogen current, the chlorobenzene is eliminated by distillation in a water yet vacuum and subsequently the 2-isocyanatomethyl-5(6)-ethylmercapto-bicyclo[2,2,1]heptane is fractionated.

Yield: 208 g (82 % of theory) $bp_{1.8} = 125°C$
$C_{11}H_{17}NOS$ (MW 211.34).
Analysis:
Calc.: N, 6.63 %; S, 15.17 %.
Found: N, 6.4 %; S, 15.2 %.

b. In a stainless steel autoclave 400 g of toluene, 59,6 g of 2-isocyanatomethyl-bicyclo[2,2,1]5-heptene and 26,2 g of ethylmercaptan are stirred, after addition of 0.3 g of azodiisobutyric-acid-nitrile, first for 2 hours at 80°–90°C, subsequently for 6 hours at 150°–160°C, the mixture is cooled and fractionated.

35.2 g of 2-isocyanatomethyl-5(6)-ethylmercapto-bicyclo [2,2,1]heptane are obtained, $bp_{1.8} = 125°C$.

EXAMPLE 3

1-[2'(3')-ethylmercapto-bicyclo[2',2',- heptyl-6'-methylcarbamoyl]-2-methoxycarbonylamino-benzimidazole To a suspension of 99.5 g of 2-methoxycarbonylamino-benzimidazole in 1400 ml of chloroform 110 g of 2-isocyanatomethyl-5-(6)-ethylmercapto-bicyclo[2,2,1]heptane are added; then the mixture is stirred for 4 hours at room temperature. The chloroform is eliminated by distillation in a water jet vacuum, the residual oil is triturated with a mixture of 120 ml of gasoline and 30 ml of ether for crystallization.

The yield in 1-[2'-(3')-ethylmercapto-bicyclo[2',1',1']heptyl-6'-methylcarbamoyl]-2-methoxycarbonyl-aminobenzimidazole having a decomposition point between 64°–66°C is 160 g (76.4 % of theory).
$C_{20}H_{26}N_4O_3S$ (MW 402.53).
Analysis:
Calc.: C, 59.68 %; H, 6.51 %; N, 13.92 %; S, 7.97 %.
Found: C, 59.4 %; H, 6.8 %; N, 13.7 %; S, 7.7 %.

EXAMPLE 4

1-[2'(3')-ethylmercapto-bicyclo[2',2',1-heptyl-6'-methylcarbamoyl]-2-methoxycarbonylamino-5(6)-phenylmercapto-benzimidazole To the suspension of 10 g of 2-methoxycarbonylamino-5-phenylmercapto-benzimidazole in 200 ml of methylene chloride are added 6 g of 2-isocyanatomethyl-5(6)-ethylmercapto-bicyclo [2,2,1]heptane, the mixture is stirred at room temperature for 5 hours, the residue is filtered off and the methylene chloride is eliminated by distillation in a water jet vacuum. The residue, which is first of oily nature, is triturated with gasoline for crystallization.

13 g (75 % of theory) of 1-[2'(3')-ethylmercapto-bicyclo-[2',2',1']-heptyl-6'-methylcarbamoyl]-2-methoxycarbonylamino5(6)-phenylmercapto-benzimidazole - decomposition point from 170° to 172°C - are obtained
$C_{26}H_{30}N_4O_3S_2$ (MW 510.7)
Analysis:
Calc.: C, 61.16 %; H, 5.92 %; N, 10.97 %; S, 12.56 %.
Found: C, 61.0 %; H, 6.1 %; N, 11.2 %; S, 12.4 %.

The compounds specified in the following table were obtained according to Examples (3) and (4) by reacting an isocyanate having the formula III with a benzimidazole derivative having the formula II, wherein $R_1$, $R_2$, $R_3$ and $R_4$ have the meanings specified above.

TABLE

| Example | formula | decomp. pt. (°C) | Analysis calc. | | found |
|---------|---------|------------------|------|---|-------|
| 5 | 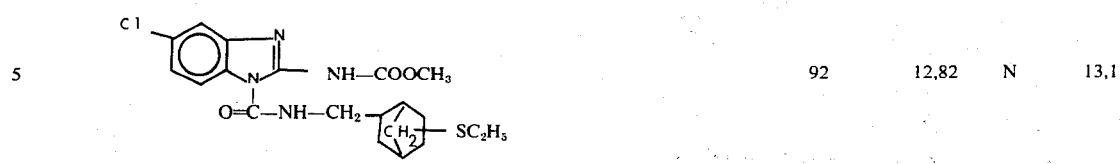 | 92 | 12,82 | N | 13,1 |
| 6 | 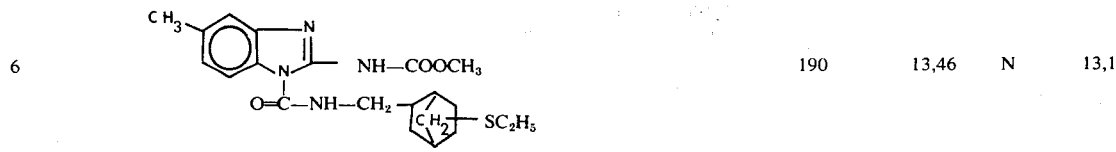 | 190 | 13,46 | N | 13,1 |

TABLE—Continued

| Example | formula | decomp. pt. (°C) | calc. | Analysis | found |
|---|---|---|---|---|---|
| 7 | 5-C₄H₉-benzimidazole, 2-NH—COOCH₃, 1-O=C—NH—CH₂—(cyclohexyl)—SC₂H₅ | 75 | 12,22 | N | 11,9 |
| 8 | 5,6-di-CH₃-benzimidazole, 2-NH—COOCH₃, 1-O=C—NH—CH₂—(cyclohexyl)—SC₂H₅ | 110–113 | 13,01 | N | 13,3 |
| 9 | 5-phenoxy-benzimidazole, 2-NH—COOCH₃, 1-O=C—NH—CH₂—(cyclohexyl)—SC₂H₅ | 200–203 | 11,3 / 6,5 | N / S | 10,9 / 6,3 |
| 10 | 5-CN-benzimidazole, 2-NH—COOCH₃, 1-O=C—NH—CH₂—(cyclohexyl)—SC₂H₅ | 205–208 | 16,4 | N | 16,4 |
| 11 | 5,6-di-Cl-benzimidazole, 2-NH—COOCH₃, 1-O=C—NH—CH₂—(cyclohexyl)—SC₂H₅ | 268–270 | 11,9 | N | 11,7 |
| 12 | benzimidazole, 2-NH—COOC₂H₅, 1-O=C—NH—CH₂—(cyclohexyl)—SC₂H₅ | 67–69 | 13,46 | N | 13,7 |
| 13 | benzimidazole, 2-NH—COOC₄H₉, 1-O=C—NH—CH₂—(cyclohexyl)—SC₂H₅ | 86–87 | 12,60 / 62,14 / 7,25 / 7,21 | N / C / H / S | 12,8 / 62,2 / 7,1 / 6,8 |
| 14 | benzimidazole, 2-NH—COOCH₃, 1-O=C—NH—CH₂—(cyclohexyl)—SC₃H₇ | 83–85 | 13,46 | N | 13,2 |

TABLE — Continued
| Example | formula | decomp. pt. (°C) | calc. | Analysis | found |
|---|---|---|---|---|---|
| 15 | 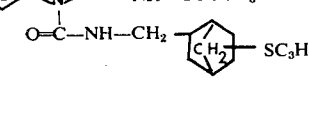 | 244–247 | 12,60 | N | 12,3 |
| 16 | 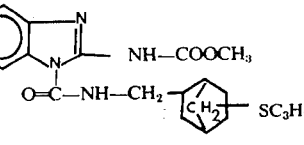 | 288 | 12,43 | N | 12,0 |
| 17 | 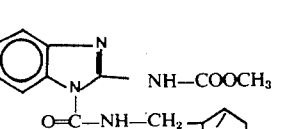 | 265 | 15,85 | N | 15,3 |
| 18 |  | 245 | 9,75 | N | 9,3 |
| 19 | 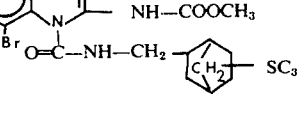 | 75–78 | 13,01<br>60,55<br>6,78<br>7,70 | N<br>C<br>H<br>S | 13,4<br>60,3<br>7,0<br>7,5 |
| 20 | 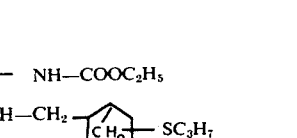 | 77 | 12,22 | N | 13,1 |
| 21 | 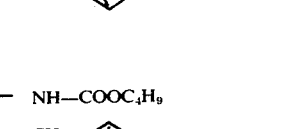 | 95 | 13,01<br>61,37<br>7,2<br>7,45 | N<br>C<br>H<br>S | 12,9<br>61,1<br>7,02<br>7,6 |
| 22 | 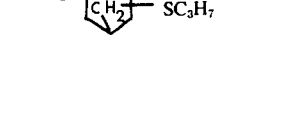 | 63 | 12,05 | N | 11,8 |
| 23 | 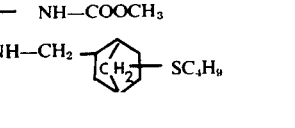 | 63–65 | 12,22 | N | 12,0 |

TABLE—Continued
| Example | formula | decomp. pt. (°C) | Analysis calc. | | found |
|---|---|---|---|---|---|
| 24 | 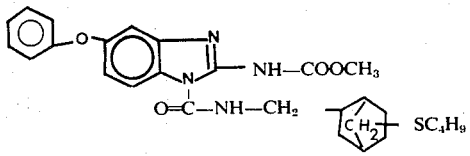 | 187–190 | 10,7 | N | 10.7 |
| 25 | 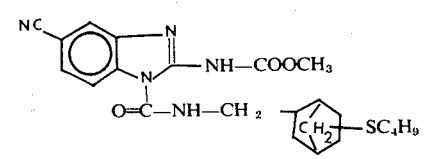 | ab 286 | 15,4 | N | 15,5 |
| 26 | 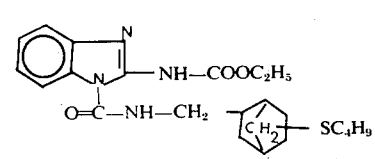 | 186 | 12,60 | N | 12,9 |
| 27 | 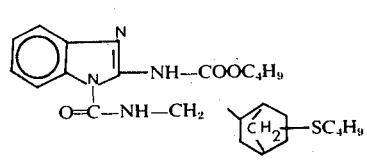 | 91 | 11,86 | N | 12,4 |
| 28 | 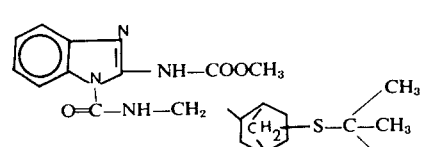 | ab 65 | 13,01 | N | 13,4 |
| 29 | 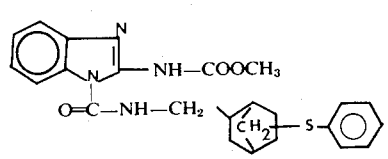 | 75–77 | 12,24<br>63,99<br>5,81 | N<br>C<br>H | 11,8<br>63,8<br>6,1 |
| 30 | 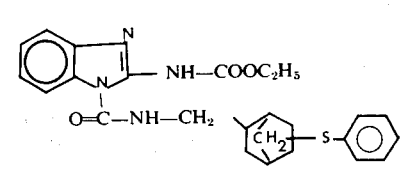 | 78–80 | 12,06 | N | 12,7 |
| 31 | 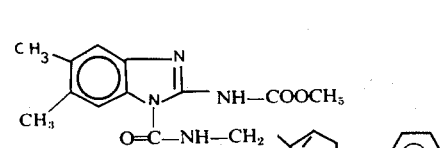 | ab 82 | 11,11<br>65,25<br>6,31<br>10,03 | N<br>C<br>H<br>O | 10,8<br>64,9<br>6,4<br>9,9 |
| 32 | 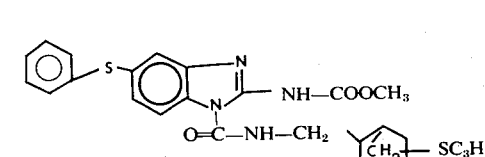 | ab 60 | 10,68<br>61,81<br>6,41 | N<br>C<br>H | 10,6<br>61,8<br>6,1 |

TABLE—Continued

| Example | formula | decomp. pt. (°C) | Analysis calc. | | found |
|---|---|---|---|---|---|
| 33 | 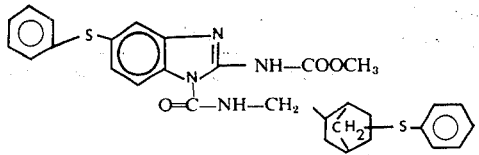 | 65–68 | 10.03<br>64.50<br>5.5 | N<br>C<br>H | 9.6<br>64.81<br>5.5 |

EXAMPLES OF APPLICATION:

EXAMPLE I

Winter wheat was sprayed to the drip-off point with aqueous suspensions of the compounds listed in table I. The concentrations applied were 120, 60 and 30 mg of active agent each per liter of spray liquor. Comparative agents were Benomyl (comparative agent I) and benzimidazole-2-carbamic-acid-methyl-ester (BCM = comparative agent II).

The spray layer dried, the plants were infested with conidiae of powdery mildew of wheat (*Erysiphe graminis*) and placed in a greenhouse, where the temperature was 22°C and the relative humidity was from 80–90 %.

After a 10 days' incubation period the plants were examined for contamination with powdery mildew of wheat and the infestation was judged by visual inspection. The degree of infestation is expressed in % of infested leaf surface as compared to untreated infested control plants. Table I shows the result of the test.

EXAMPLE II

Sugar beet plants were infested at the 6-leaf-stage with conidiae of *Cercospora beticola* causing beet leaf spot and placed dripping wet in a chamber having a temperature of 25°C and a relative humidity of 100 %. The plants remained in this chamber for one day and were then placed in a greenhouse having a temperature of from 25°–26°C and a relative humidity of from 85–90 %.

After a 5 days' incubation period the plants were treated with aqueous suspensions of the compounds and comparative agents shown in table II, applied in concentrations of 250, 125, and 60 mg of active agent per liter of spray liquor.

The spray layer dried, the plants were transferred back to the green-house and examined by visual inspection for infestation with beet leaf spot after an incubation period of 3 weeks. The infestation is expressed in % of contaminated leaf surface as compared to untreated infested control plants.

The results of the test are shown in table II.

EXAMPLE III

Tomato plants of the variety "Rheinlands Ruhm" were infested at the 3-leaf-stage with conidiae of *Cladosporium fulvum* causing leaf mould of tomatoes and placed for 24 hours in a chamber having a temperature of 25°C and a relative humidity of 100 %. Subsequently, the plants were placed in a greenhouse having a temperature of from 25° to 26°C and a relative humidity of from 85–90 %.

After a 5 days' infestation period the plants were sprayed dripping wet with aqueous suspensions of the compounds and comparative agents specified in table III, in concentrations of 250, 125 and 60 mg of active agent per liter of spray liquor. Upon drying of the spray layer the plants were transferred back to the greenhouse.

After an incubation period of 3 weeks the plants were examined by visual inspection for their contamination with Cladosporium; the degree of infestation is expressed in table III in % of contaminated leaf surface as compared to untreated infested control plants.

EXAMPLE IV

Winter wheat was mixed in 4 repetitions for 10 minutes in a shaking machine with the compounds and comparative agents specified in table IV in concentrations of 400, 200 and 100 mg of active agent per 100 kg of seed. Subsequently, 10 grains each of the treated seed — in 5 repetitions — were sown in earth-filled pots and placed in a greenhouse. After emerging and attaining the 4-leaf-stage the plants were infested with conidiae of powdery mildew of wheat (*Erysiphe graminis*) and placed in a greenhouse having a temperature of from 20°–22°C and a relative atmospheric humidity of from 80–90 %.

After an incubation period of 10 days the plants were examined by visual inspection for contamination with powdery mildew, the degree of contamination being expressed in % of contaminated leaf surface as compared to untreated infested control plants.

The results are shown in Table IV.

EXAMPLE V (Anthelminthics)

The compounds having formula I were tested on sheep which were infested for the experiment with various types of gastrointestinal nematodes. At the end of the prepatency period (the lapse of time between infestation and pubescence of the parasites upon the beginning of egg production) the number of eggs per gram of excrement (EpG) was determined by an ameliorated version of the McMaster procedure (Wetzel, Tieraerztl.Umschau 6, pg. 209–210, 1951), and subsequently the sheep passed a single oral or subcutaneous treatment. At several given moments after the treatment according to McMaster the number of eggs per gram of excrement was determined and their reduction (in percent) calculated as compared to the initial value.

Table V shows the action on gastro-intestinal strongyles of compounds according to the invention as related to the comparative agent Thiabendazol.

EXAMPLE VI

Moreover, the efficiency of the products of the invention as anthelminthics can be demonstrated by a further test involving a larger animal (see table VI). The proof of efficiency is provided by a dog infested for this experiment with ancyclostoma, whose output of ancylostoma eggs is checked repeatedly according to the McMaster procedure. The reduction in percentage of the number of eggs is calculated by comparing the quantity of ancylostoma eggs found before the treatment and afterwards.

Table VI:

| Compound according to example | D.c.m. mg/kg | application | effect |
|---|---|---|---|
| 19 | 10 | p.o. | 80 % |
| 4 | <5 | p.o. | 100 % |
| 13 | 10 | p.o. | 65 % |
| Thiabendazol[r) | 500 | p.o. | 82 % |

[r)Novilla, M. N. and R. F. Flauta, Phillip J. Vet. Med 6, 135–144, 1967

| Compound according to example | Table I % Leaf contamination with powdery mildew of wheat at mg of active agent/ liters of spray liquor | | | Table II % Leaf contamination with Cercospora on carrots at mg active agent/liters of spray liquor | | |
|---|---|---|---|---|---|---|
| | 120 | 60 | 30 | 250 | 125 | 60 |
| 3 | 0 | 5 | 12 | 0 | 0 | 3 |
| 12 | 0 | 10 | 15 | 0 | 0 | 8 |
| 14 | 0 | 8 | 15 | 0 | 0 | 5 |
| 21 | 0 | 5 | 10 | 0 | 0 | 3 |
| 28 | 0 | 10 | 15 | 0 | 0 | 12 |
| 29 | 0 | 8 | 15 | 0 | 0 | 8 |
| 30 | 0 | 10 | 18 | 0 | 0 | 10 |
| cf. agent I benomyl | 0 | 8 | 14 | 0 | 0 | 5 |
| cf. agent II BCM | 3 | 18 | 30 | 10 | 18 | 28 |
| untreated infected plants | 100 | 100 | 100 | 100 | 100 | 100 |

| Compound according to example | Table III % Leaf contamination with Cladosporium on tomatoes at mg of active agent/liters of spray liquor | | | Table IV % powdery mildew contamination on winter wheat at mg active agent/ 100 kg of seed | | |
|---|---|---|---|---|---|---|
| | 250 | 125 | 60 | 400 | 200 | 100 |
| 3 | 0 | 5 | 10 | 0 | 0 | 8 |
| 12 | 0 | 8 | 15 | 0 | 0 | 10 |
| 14 | 0 | 5 | 12 | 0 | 0 | 5 |
| 21 | 0 | 8 | 15 | 0 | 0 | 8 |
| 28 | 0 | 10 | 18 | 0 | 0 | 10 |
| 29 | 0 | 8 | 15 | 0 | 0 | 8 |
| 30 | 0 | 12 | 20 | 0 | 0 | 12 |
| cf. agent I benomyl | 0 | 8 | 15 | 0 | 0 | 10 |
| cf. agent II BCM | 5 | 12 | 36 | 0 | 2 | 15 |
| untreated infected plants | 100 | 100 | 100 | 100 | 100 | 100 |

Table V

| Compound according to example | D.c.m. mg/kg | application | effect |
|---|---|---|---|
| 3 | <20 | p.o. | 100 % |
| | 20 | s.c. | >80% |
| 19 | 20 | p.o. | >95 % |
| 4 | 0,5 | p.o. | 100 % |
| | 5,0 | s.c. | >90 % |
| Thiabendazol[r) [2-(4-Thiazolyl)-benzimidazol] | 50 | p.o. | >99 % |
| | 20 | s.c. | 0 % |

[r)Eaton, L. G., O. H. Siegmund, A. D. Rankin and R. G. Bramel Texas Rep. Biol. Med. 27:(2): 693–708, 1969

Table VII

| Compound according to example | (toxicity) Tolerance (Dosis tolerata maxima) with single application of the white mouse | |
|---|---|---|
| 3 | oral: | >800 mg/kg |
| | subcutaneous: | 400 mg/kg |
| 19 | oral: | >1600 mg/kg |
| | subcutaneous: | 1600 mg/kg |
| 4 | oral: | 800 mg/kg |
| | subcutaneous: | 200 mg/kg |

We claim:
1. A benzimidazole having the formula

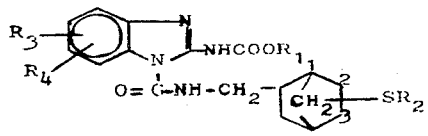

wherein
R₁ represents alkyl having from 1 to 4 carbon atoms,
R₂ represents alkyl having from 1 to 5 carbon atoms, cycloalkyl having from 5 to 8 carbon atoms, benzyl or phenyl, SR₂ being in 2- or 3- position
R₃ represents hydrogen, alkyl having from 1 to 4 carbon atoms or alkanoyl having from 1 to 4 carbon atoms, chlorine, bromine, cyano, methoxy, ethoxy, phenyloxy, phenylthio or benzoyl, and
R₄ represents hydrogen, chlorine or methyl, or mixtures ofo the isomers obtained by interchanging R₃ and R₄.

2. The compound of claim 1 which is 1-[2'(3')-ethylmercapto-bicyclo[2',2',1']-heptyl-6'-methylcarbamoyl]-2-methoxycarbonylamino-benzimidazole.

3. The compound of claim 1 which is 1-[2'(3')-ethylmercapto-bicyclo[2',2',1']-heptyl-6'-methylcarbamoyl]-2-methoxycarbonylamino-5(6)-phenylmercapto-benzimidazole.

4. The compound of claim 1 which is 1-[2'-(3')-ethylmercapto-bicyclo[2',2',1']-heptyl-6'-methylcarbamoyl]-2-butoxycarbonylamino-benzimidazole.

5. The compound of claim 1 which is 1-[2'(3')-propylmercapto-bicyclo[2',2',1']-heptyl-6'-methylcarbamoyl]-2-ethoxycarbonylamino-benzimidazole.

6. The compound of claim 1 which is 1-[2'(3')-butylmercapto-bicyclo[2',2',1']-heptyl-6'-methylcarbamoyl]-2-methoxycarbonylamino-5(6)-phenoxymercapto-benzimidazole.

7. The compound of claim 1 which is 1-[2'(3')-propylmercapto-bicyclo[2',2',1']-heptyl-6'-methylcarbamoyl]-2-methoxycarbonylamino-5(6)-phenylmercapto-benzimidazole.

8. The compound of claim 1 which is 1-[2'(3')-phenylmercapto-bicyclo[2',2',1']-heptyl-6'-methylcarbamoyl]-2-methoxycarbonylamino-5(6)-phenylmercapto-benzimidazole.

* * * * *